(12) United States Patent
Yin et al.

(10) Patent No.: US 11,538,222 B2
(45) Date of Patent: Dec. 27, 2022

(54) VIRTUAL OBJECT PROCESSING METHOD AND SYSTEM AND VIRTUAL REALITY DEVICE

(71) Applicant: LENOVO (BEIJING) LIMITED, Beijing (CN)

(72) Inventors: Jie Yin, Beijing (CN); Xu Zhao, Beijing (CN); Ge Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/623,620

(22) PCT Filed: Oct. 23, 2017

(86) PCT No.: PCT/CN2017/107304
§ 371 (c)(1),
(2) Date: Dec. 17, 2019

(87) PCT Pub. No.: WO2018/233162
PCT Pub. Date: Dec. 27, 2018

(65) Prior Publication Data
US 2020/0219318 A1    Jul. 9, 2020

(30) Foreign Application Priority Data
Jun. 23, 2017 (CN) .......................... 201710492052.9

(51) Int. Cl.
*G06T 19/00* (2011.01)
*G06F 3/01* (2006.01)

(52) U.S. Cl.
CPC .............. *G06T 19/00* (2013.01); *G06F 3/011* (2013.01); *G06F 2203/012* (2013.01); *G06T 2200/24* (2013.01)

(58) Field of Classification Search
CPC ... G06T 19/00; G06T 19/006; G06T 2200/24; G06F 3/048–0489; G06F 3/011; G06F 2203/012
See application file for complete search history.

(56) References Cited

U.S. PATENT DOCUMENTS 5,140,678 A  *  8/1992  Torres ................. G06F 3/04817
                                                     715/776
2005/0022236 A1 *  1/2005  Ito ...................... H04N 5/44543
                                                     725/39

(Continued)

FOREIGN PATENT DOCUMENTS

CN       105912123 A     8/2016
CN       106249894 A    12/2016
(Continued)

OTHER PUBLICATIONS

The World Intellectual Property Organization (WIPO) International Search Report for PCT/CN2017/107304 dated Mar. 23, 2018 6 Pages (including translation).

*Primary Examiner* — Daniel F Hajnik
(74) *Attorney, Agent, or Firm* — Anova Law Group, PLLC

(57) ABSTRACT

The present disclosure provides a method for processing a virtual object, including: acquiring at least one virtual object; determining at least one display layer in a virtual reality space, where the virtual reality space is divided into a plurality of display layers, and a plurality of display layers are arranged in a stacked manner; and displaying the at least one virtual object in the at least one display layer. The present disclosure also provides a virtual object processing system and a virtual reality device.

10 Claims, 12 Drawing Sheets

(56) References Cited

U.S. PATENT DOCUMENTS

| | | | |
|---|---|---|---|
| 2009/0237403 A1* | 9/2009 | Horii | G06T 19/00 345/427 |
| 2009/0307623 A1* | 12/2009 | Agarawala | G06F 3/04815 715/765 |
| 2012/0047465 A1* | 2/2012 | Noda | G06F 3/0346 715/848 |
| 2012/0139915 A1* | 6/2012 | Muikaichi | G06T 19/00 345/419 |
| 2012/0240064 A1* | 9/2012 | Ramsay | G06T 11/00 715/762 |
| 2013/0167060 A1* | 6/2013 | Wang | G06F 3/04883 715/769 |
| 2014/0059460 A1* | 2/2014 | Ho | G06F 3/0488 715/766 |
| 2016/0034153 A1* | 2/2016 | Lejeune | G06F 3/04842 715/765 |
| 2017/0371523 A1* | 12/2017 | Liao | G06F 3/017 |
| 2018/0321798 A1* | 11/2018 | Kawamura | G06F 3/0481 |
| 2019/0138186 A1* | 5/2019 | Rolih | G06F 3/0482 |
| 2020/0264694 A1* | 8/2020 | Yakishyn | G06F 3/011 |

FOREIGN PATENT DOCUMENTS

| | | |
|---|---|---|
| CN | 106293127 A | 1/2017 |
| CN | 106484397 A | 3/2017 |

* cited by examiner

VIRTUAL OBJECT PROCESSING METHOD AND SYSTEM AND VIRTUAL REALITY DEVICE

CROSS-REFERENCES TO RELATED APPLICATIONS

This application is a national phase entry under 35 U.S.C. § 371 of International Application No. PCT/CN2017/107304, filed on Oct. 23, 2017, which claims the priority of Chinese Patent Application No. 201710492052.9, filed with the State Intellectual Property Office of P. R. China on Jun. 23, 2017, the entire contents of which are incorporated herein by reference.

TECHNICAL FIELD

The present disclosure relates to a virtual object processing method, a virtual object processing system, and a virtual reality device.

BACKGROUND

A virtual reality system is a computer simulation system that enables creating and experiencing of a virtual world. The system uses a computer to generate a virtual environment. By wearing virtual reality devices, users can feel that they are in the virtual environment, and also, by operating tools, users can also manipulate various objects in a virtual scene, so that user experience can be improved.

However, the inventor found that in the prior art, when various objects in a virtual scene are displayed in a virtual reality space, a display manner of the virtual objects may not be appropriate, resulting in a low efficiency of space utilization.

SUMMARY

An aspect of the present disclosure provides a virtual object processing method, including: acquiring at least one virtual object; determining at least one display layer in a virtual reality space, where the virtual reality space is divided into a plurality of display layers, and the plurality of display layers are arranged in a stacked manner; and displaying the at least one virtual object in the at least one display layer.

Optionally, any one or more of the at least one virtual object includes at least one virtual sub-object. After the at least one virtual object is displayed in the at least one display layer, the method further includes: acquiring at least one virtual sub-object that is included in a first virtual object in the at least one virtual object; determining at least one first display layer in the virtual reality space to display the at least one virtual sub-object that is included in the first virtual object, where the at least one first display layer is different from the display layer that displays the first virtual object; and displaying the at least one virtual sub-object in the at least one first display layer.

Optionally, the method further includes: based on a first region corresponding to the first virtual object in the display layer that displays the first virtual object, determining a second region of the first display layer, and displaying the at least one virtual sub-object that is included in the first virtual object.

Optionally, at least one virtual sub-object that is included in the first virtual object includes at least a first virtual sub-object. The method further includes pre-processing the first virtual sub-object to acquire processing information; and displaying the processing information in the first display layer.

Optionally, the method includes receiving an input operation for the virtual object and/or the virtual sub-object; and performing a process corresponding to the input operation.

Optionally, the method further includes acquiring at least one virtual sub-object that is included in the second virtual object among the at least one virtual object; and displaying at least one virtual sub-object that is included in the second virtual object in the display layer that displays the second virtual object.

Optionally, the method further includes switching a relative position between the second display layer and other display layers in the at least one display layer, where the second display layer is different from the other display layers.

Another aspect of the present disclosure provides a virtual object processing system, including a first acquisition module configured to acquire at least one virtual object; a first determination module configured to determine at least one display layer in a virtual reality space, where the virtual reality space is divided into a plurality of display layers, and the plurality of display layers are arranged in a stacked manner; and a first display module configured to display the at least one virtual object in the at least one display layer.

Optionally, any one or more of the at least one virtual object includes at least one virtual sub-object, and the system further includes: a second acquisition module configured, after the at least one virtual object is displayed in the at least one display layer, to acquire the at least one virtual sub-object that is included in the first virtual object among the at least one virtual object; a second determination module configured to determine at least one first display layer in the virtual reality space for displaying the at least one virtual sub-object that is included in the first virtual object, where, the at least one first display layer is different form the display layer that displays the first virtual object; and a second display module configured to display the at least one virtual sub-object in the at least one first display layer.

Optionally, the system further includes: a third determination module, configured to determine a second region of the at least one first display layer based on a first region of the first virtual object in a display layer that displays the first virtual object, and a third display module, configured to display at least one virtual sub-object that is included in the first virtual object in the second region.

Optionally, at least one virtual sub-object that is included in the first virtual object includes at least a first virtual sub-object. The system further includes a processing module configured to pre-process the first virtual sub-object to acquire processing information; and a fourth display module, configured to display the processing information in the at least one first display layer.

Optionally, the system includes: a receiving module configured to receive an input operation for the virtual object and/or the virtual sub-object; and an execution module configured to perform a process corresponding to the input operation.

Optionally, the system further includes: a third acquisition module configured to acquire at least one virtual sub-object that is included in the second virtual object among the at least one virtual object; and a fifth display module configured to display the at least one virtual sub-object in the display layer that displays the second virtual object.

Optionally, the system further includes: a switching module for switching a relative positions between the second display layer and other display layers in the at least one display layer, where the second display layer is different from the other display layers.

Another aspect of the present disclosure provides a virtual reality device including: at least one memory having a computer program stored thereon; at least one processor configured to execute the computer program to achieve the following operations: acquiring at least one virtual object; determining at least one display layer in a virtual reality space, where the virtual reality space is divided into a plurality of display layers, and the plurality of display layers are arranged in a stacked manner; and a display module, configured to, based on the processing result of the at least one processor, display the at least one virtual object in the at least one display layer.

Optionally, any one or more of the at least one virtual object includes at least one virtual sub-object. Herein, the at least one processor is further configured, after the display module displays the at least one virtual object in the at least one display layer, to acquire the at least one virtual sub-object that is included in a first virtual object in the at least one virtual object; and to determine at least one first display layer in the virtual reality space to display the at least one virtual sub-object that is included in the first virtual object, where the at least one first display layer is different from the display layer that displays the first virtual object. The display module is further configured to display, based on a processing result of the at least one processor, the at least one virtual sub-object in the at least one first display layer.

Another aspect of the present disclosure provides a computer program. The computer program includes computer-executable instructions, and the instructions, when executed, can be used to implement the foregoing methods.

DESCRIPTION OF THE DRAWINGS

For a more complete understanding of the disclosure and the advantages thereof, reference will now be made to the following description combined with the accompanying drawings, in which.

DETAILED DESCRIPTION

Figure 1:
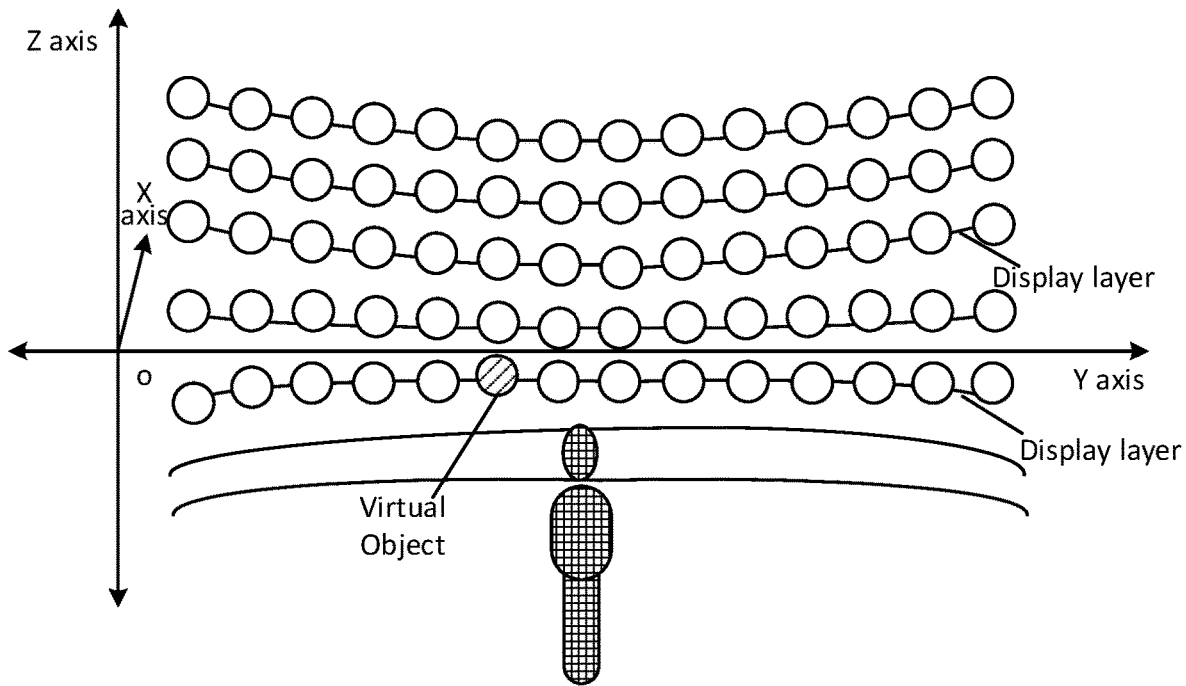
FIG. 1 schematically illustrates a virtual object processing method and an application scenario of a virtual reality device according to an embodiment of the present disclosure.

Hereinafter, embodiments of the present disclosure will be described with reference to the drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure.

Terms used herein are only for describing embodiments only but not intended to limit the present disclosure. Herein, words used, "one," "one (type)," and "the," should also include "a plurality of" and "a plurality of types," unless otherwise explicitly indicated. Also, the terms "including", "comprising", and the like, as used herein, indicate the presence of stated features, steps, operations, and/or components, but do not exclude the presence or addition of one or more other features, steps, operations, or components Unless otherwise defined, all the technical and scientific terms used herein have the same or similar meanings as generally understood by those skilled in the art. It should be noted that terms used herein should be interpreted as having meanings that are consistent with the context of the present specification and should not be interpreted in an idealized or overly rigid manner.

Some block diagrams and/or flowcharts are shown in the drawings. It should be understood that some blocks and/or flows or combinations thereof in the block diagrams and/or the flowcharts can be implemented by computer program instructions. These computer program instructions may be provided to a processor of a general-purpose computer, a special-purpose computer, or other programmable-data processing device such that, when executed by the processor, these instructions may be configured to generate a device that can implement functions/operations illustrated in these block diagrams and/or flowcharts.

The techniques of the present disclosure may be implemented in the form of hardware and/or software (including firmware, microcode, etc.). In addition, the techniques of the present disclosure may in a form of a computer program product on a computer-readable medium that stores instructions. The computer program product can be used by or with references to an instruction execution system. In the context of the present disclosure, a computer-readable medium may be any medium that can contain, store, communicate, propagate, or transport the instructions. For example, the computer-readable medium may include, but is not limited to, an electronic, magnetic, optical, electromagnetic, infrared or semiconductor system, apparatus, device, or propagation medium. Optionally, examples of the computer-readable medium include: a magnetic storage device such as a magnetic tape or a hard disk (HDD); an optical storage device such as a compact disk read-only memory (CD-ROM); a memory such as a random-access memory (RAM) or a flash memory; and/or a cable/wireless communication link.

Embodiments of the present disclosure provide a virtual object processing method, and a virtual reality device and a virtual object processing system capable of applying the method. The method includes: acquiring at least one virtual object; determining at least one display layer in a virtual reality space, where the virtual reality space is divided into a plurality of display layers, and the plurality of display layers are stacked; and displaying at least one virtual object in the at least one display layer.

FIG. 1 schematically illustrates a virtual object processing method and an application scenario of a virtual reality device according to an embodiment of the present disclosure.

As shown in FIG. 1, in a virtual reality space, by wearing a virtual reality device, a user can feel that he is in a virtual environment. The virtual reality space is three-dimensional and stereoscopic. According to an embodiment of the present disclosure, the objects in the virtual reality space are arranged in the virtual reality space with the user as the center. According to the embodiment of the present disclosure, a plurality of virtual objects are arranged in layers on a plurality of display layers in a virtual reality space. As shown in FIG. 1, different virtual objects have a certain distance between with each other in the virtual reality space, and the plurality of virtual objects are scattered in the display layers.

According to an embodiment of the present disclosure, there may be a certain distance between two adjacent display layers along an X-axis direction, so that the display layers in the virtual reality space can exhibit more sense of depth. According to an embodiment of the present disclosure, there may be a certain distance between two adjacent display layers along a Z-axis direction, so that the display layers in the virtual reality space can exhibit sense of depth in the Z-axis direction. According to an embodiment of the present disclosure, the two adjacent display layers may also be at the same height in the Z-axis direction, and only have a certain distance spaced in the X-axis direction, so that the virtual objects in the virtual reality space, when displayed in the space, can exhibit more sense of space, and the space can be used more efficiently. It should be noted that FIG. 1 is a three-dimensional perspective view. According to an embodiment of the present disclosure, the way to establish a three-dimensional perspective coordinate system may be to establish an XYZ rectangular coordinate system with any point in the virtual reality space as the origin O, where the X axis points to the front orientation of the user, the Y axis points to the user's right, and the Z axis is perpendicular to the XOY plane, as shown in FIG. 1.

It should be noted that the arrangement manner of the display layers in the virtual reality space is not limited to the arrangement manner described above, and any manner of arranging the virtual reality space in layers should be a part of the present disclosure. For example, with the user's location as the center, and the virtual reality space can be divided into multiple concentric spherical display layers according to different radii. Alternatively, the virtual reality space can also be divided into multiple planar or non-planar display layers arranged horizontally. Alternatively, the virtual reality space can also be divided into a plurality of planar or non-planar display layers arranged vertically. The above are all examples, but the present disclosure is not limited thereto. According to an embodiment of the present disclosure, after the at least one virtual object is distributed in the display layer, the user can manipulate the virtual object and/or the virtual sub-object in the virtual scene through an operation tool.

Figure 2A:
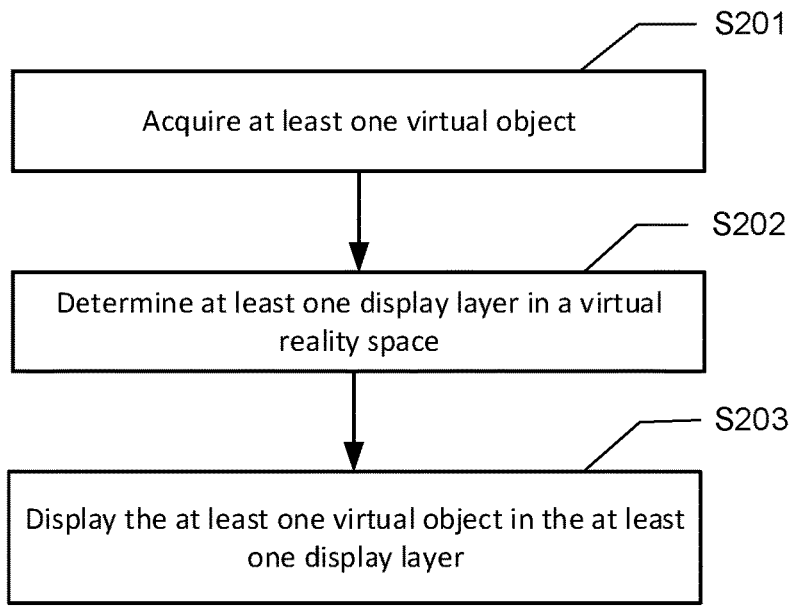
FIG. 2A schematically illustrates a flowchart of a virtual object processing method according to an embodiment of the present disclosure.

FIG. 2A schematically illustrates a flowchart of a virtual object processing method according to an embodiment of the present disclosure.

As shown in FIG. 2A, the method includes operations S201-S203.

In operation S201, at least one virtual object is acquired

According to the embodiment of the present disclosure, there may be one or more virtual objects in the virtual reality space, and there are a plurality of display layers in the virtual reality space, and the plurality of display layers are arranged in a stacked manner. That is, the plurality of display layers have a certain distance in space, and are arranged as stacked layers.

Figure 2B:
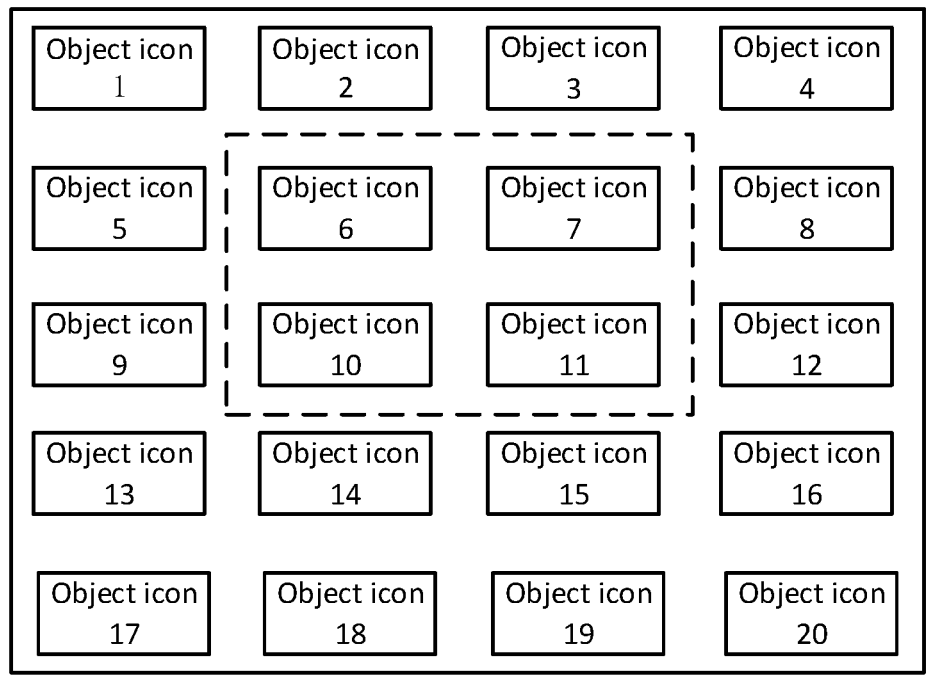
FIG. 2B schematically illustrates a schematic diagram of acquiring at least one virtual object according to an embodiment of the present disclosure.

FIG. 2B schematically illustrates a schematic diagram of acquiring at least one virtual object according to an embodiment of the present disclosure. As shown in FIG. 2B, according to an embodiment of the present disclosure, there may be a plurality of virtual objects in the virtual reality space, and the acquired at least one virtual object may be multiple virtual objects in a dashed box as shown in FIG. 2B.

In operation S202, at least one display layer in the virtual reality space is determined, where the virtual reality space is divided into plurality of display layers, and the plurality of display layers are arranged in a stacked manner.

According to an embodiment of the present disclosure, after acquiring at least one virtual object, at least one display layer in the virtual reality space may be determined for displaying the acquired virtual object. Herein, when multiple virtual objects are acquired, the multiple virtual objects may be scattered and displayed on multiple ones of display layers. According to an embodiment of the present disclosure, the display layer may be a curved surface or a plane. For example, with the user as the center, the display layers are distributed around the user as a curved surface, including four angles of front, back, left, and right. The curved surface can be a spherical surface, or an ellipsoidal surface. The plane can be a surface of a user-centered cube or cuboid. it should be noted that the shape of the display layer may also be an irregular shape, which is not elaborated here.

In operation S203, the at least one virtual object is displayed in the at least one display layer.

According to an embodiment of the present disclosure, after the display layer is determined, the acquired at least one virtual object is displayed in the at least one display layer. It should be noted that the determined display layer may be a randomly allocated display layer, or a preset or pre-selected display layer. The determination here should include at least the above two cases.

Through the embodiments of the present disclosure, the virtual reality space is layered to acquire plurality of display layers, and the virtual objects in the virtual reality space are scattered and displayed in the display layers, so that not only the virtual objects in the virtual reality space, when displayed in the space, can exhibit more sense of space, but also the space can be used more efficiently.

The method shown in FIG. 2A is further described below with reference to FIGS. 3A to 4B in combination with specific embodiments.

Figure 3A:
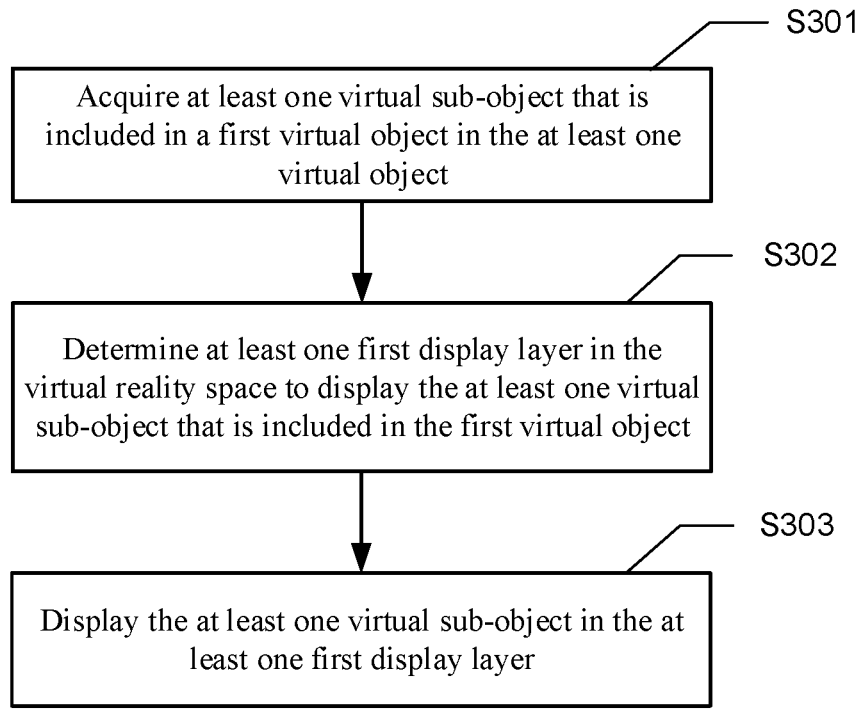
FIG. 3A schematically illustrates a flowchart of a virtual object processing method according to another embodiment of the present disclosure.

FIG. 3A schematically illustrates a flowchart of a virtual object processing method according to another embodiment of the present disclosure. In this embodiment, in addition to operations S201 to S203 described above with reference to FIG. 2, operations S301 to S303 are also included. For brevity of description, the description of operations S201 to S203 is omitted here.

As shown in FIG. 3A, the virtual object processing method further includes operations S301-S303.

In operation S301, at least one virtual sub-object that is included in a first virtual object among the at least one virtual object is acquired.

According to an embodiment of the present disclosure, any one or more of the at least one virtual object may include at least one virtual sub-object. Hereinafter, for convenience of description, a virtual object that includes at least one virtual sub-object is referred to as a first virtual object.

After the at least one virtual object is displayed in the at least one display layer, at least one virtual sub-object that is included in the first virtual object is acquired. For example, the first virtual object is a folder A, and at least one virtual sub-object of the first virtual object may be a sub-file a, a sub-file b, and a sub-file c of the folder A.

In operation S302, at least one first display layer in the virtual reality space is determined for displaying the at least one virtual sub-object that is included in the first virtual object, where the at least one first display layer is different from the display layer that displays the first virtual object.

According to an embodiment of the present disclosure, there are plurality of display layers in the virtual reality space, and at least one first display layer may thus be determined for displaying the at least one virtual sub-object that is included in the first virtual object, where the first display layer is different from the display layer that displays the first virtual object.

In operation S303, at least one virtual sub-object is displayed in the at least one first display layer.

Figure 3B:
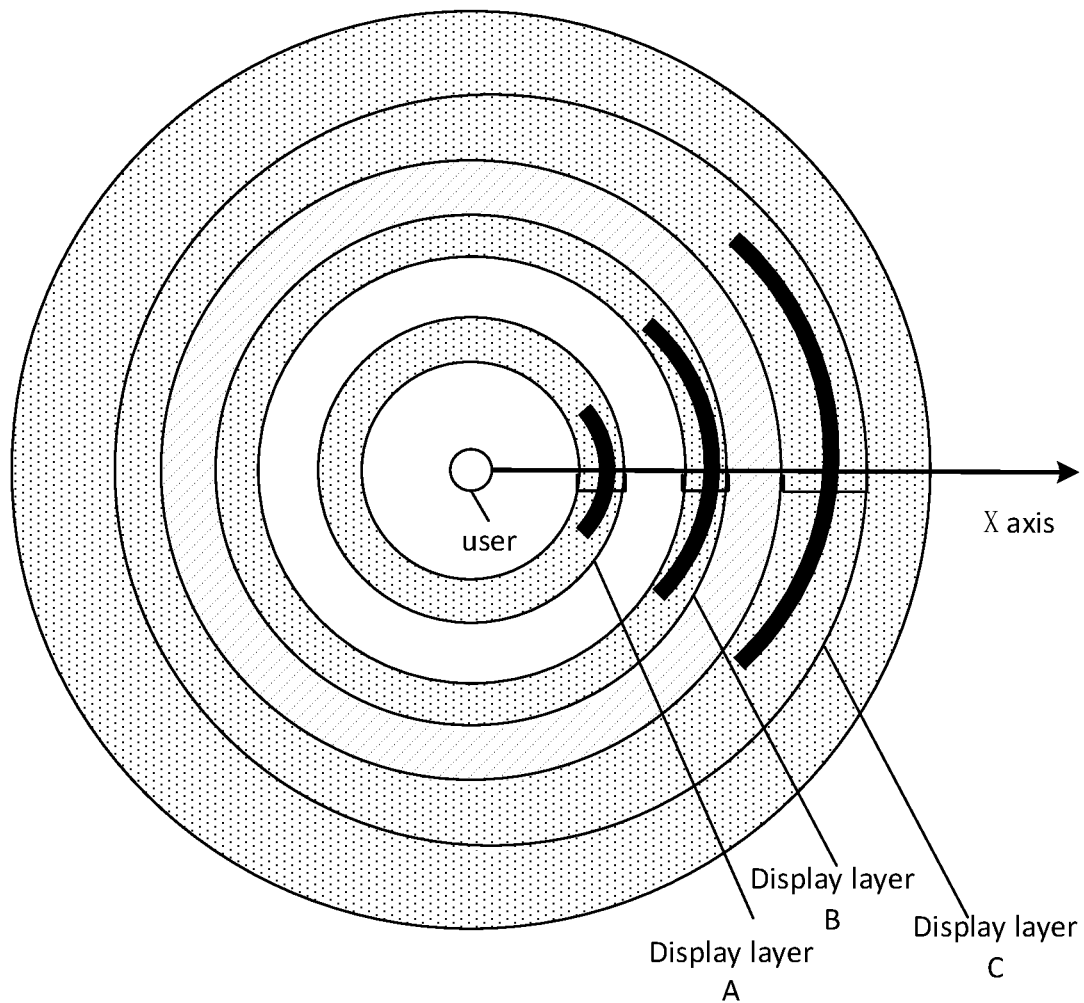
FIG. 3B schematically illustrates an arrangement of virtual objects and virtual sub-objects in a display layer according to an embodiment of the present disclosure.

For example, FIG. 3B schematically illustrates an arrangement of virtual objects and virtual sub-objects in the display layers according to an embodiment of the present disclosure. As shown in FIG. 3B, a folder A is displayed on a display layer A, and a sub-file a, a sub-file b, and a sub-file c are displayed on a display layer B. Herein, positions of the folder A, the sub-file a, the sub-file b, and the sub-file b on different display layers correspond to each other, and have a mapping relationship. With the user as the center, the user can operate on the folder A displayed in the display layer A, and can also operate the sub-file a, sub-file b, and sub-file c displayed in the display layer B. It should be noted that when the sub-file a, the sub-file b, and the sub-file c include other files, the content of the sub-file can be displayed in a display layer C, and the positions of the files displayed in the display layer C and the display layer B correspond to each other, which is not elaborated here.

According to an embodiment of the present disclosure, an Nth virtual sub-object can be displayed on an Mth display layer; an (N+1)th virtual sub-object can be displayed on an (M+1)th level target display layer, where the Nth virtual sub-object is associated with (N+1) virtual sub-objects, and N and M are integers greater than or equal to 1.

Through the embodiments of the present disclosure, distributing virtual objects and virtual sub-objects in different display layers can not only improve space utilization efficiency, but also achieve fast operation on the virtual objects and/or virtual sub-objects in a virtual reality space to achieve an effect of fast positioning.

Figure 3C:
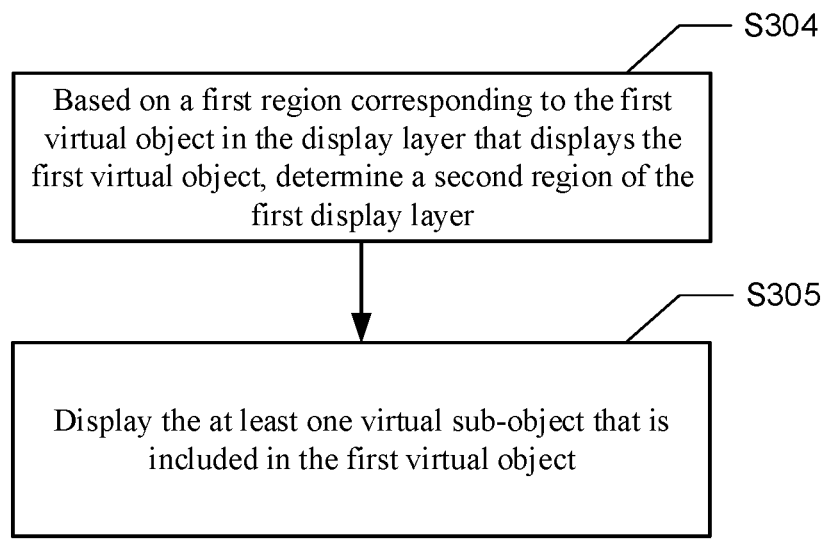
FIG. 3C schematically illustrates a flowchart of a virtual object processing method according to another embodiment of the present disclosure.

FIG. 3C schematically illustrates a flowchart of a virtual object processing method according to another embodiment of the present disclosure. In this embodiment, in addition to operations S201 to S203 described above with reference to FIG. 2, operations S304 to S305 are also included. For brevity of description, the description of operations S201 to S203 is omitted here.

As shown in FIG. 3C, the virtual object processing method further includes operations S304-S305.

In operation S304, a second region of at least one first display layer is determined based on a first region of the first virtual object in the display layer that displays the first virtual object.

In operation S305, at least one virtual sub-object that is included in the first virtual object is displayed in the above-mentioned second region.

According to an embodiment of the present disclosure, for example, FIG. 3B schematically illustrates a schematic diagram of an arrangement of the virtual objects and the virtual sub-objects in a display layer according to an embodiment of the present disclosure. As shown in FIG. 3B, a black-lined portion in the display layer A is a first region for displaying the first virtual object. Based on the first region, it is determined that a black-lined portion in the display layer B is the second region. At least one virtual sub-object is displayed in the second region.

Through the embodiments of the present disclosure, virtual objects and virtual sub-objects are distributed in different display layers, and the second region is determined based on the first region. The positions of the objects arranged on the first region and the second region correspond to each other. As such, not only the space utilization efficiency can be improved, but also the virtual objects and/or virtual sub-objects in the virtual reality space can be fast operated to achieve an effect of fast positioning.

Figure 3D:
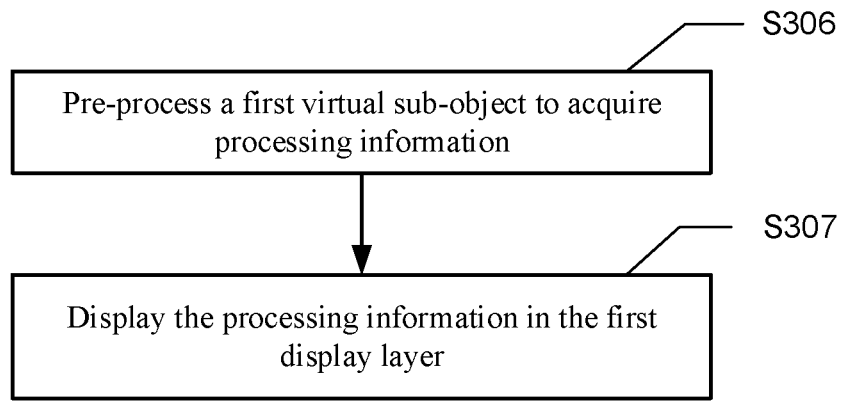
FIG. 3D schematically illustrates a flowchart of a virtual object processing method according to another embodiment of the present disclosure.

FIG. 3D schematically illustrates a flowchart of a virtual object processing method according to another embodiment of the present disclosure. In this embodiment, in addition to operations S201 to S203 described above with reference to FIG. 2, operations S306 to S307 are also included. For brevity of description, the description of operations S201 to S203 is omitted here.

As shown in FIG. 3D, the virtual object processing method further includes operations S306-S307.

In operation S306, the first virtual sub-object is pre-processed to acquire processing information.

In operation S307, the processing information is displayed on at least one first display layer.

According to the embodiment of the present disclosure, at least one virtual sub-object that is included in the first virtual object includes at least the first virtual sub-object. After the at least one virtual sub-object is displayed in the display layer of the virtual reality space, the virtual sub-object may be pre-processed, and then the processed processing information is displayed. For example, when the first virtual sub-object is a certain movie, the movie is pre-processed, and the content of the movie can be previewed at the first display layer. For example, when the first virtual sub-object is a document or program, the document is pre-processed, and the content of the document or program can be previewed in the first display layer.

Through the embodiments of the present disclosure, pre-processing is performed on virtual sub-objects to acquire processing information, and then the processed processing information is displayed, such that not only can the operation of the virtual sub-object is realized, but also the preview of the content of the virtual sub-object can be realized, which improves the user experience.

Figure 3E:
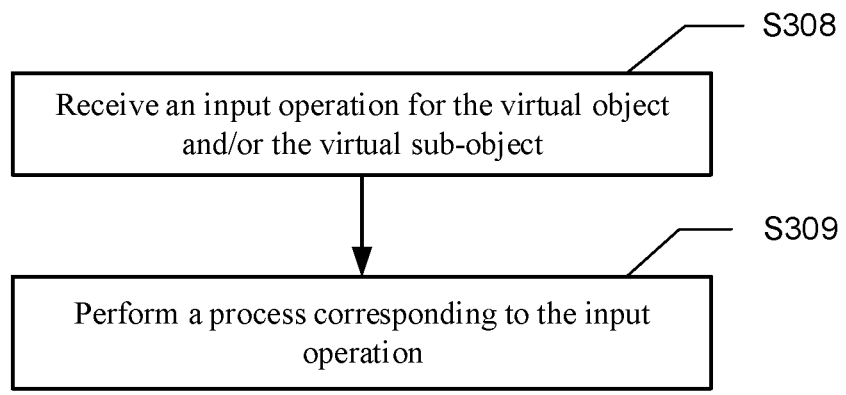
FIG. 3E schematically illustrates a flowchart of a virtual object processing method according to another embodiment of the present disclosure.

FIG. 3E schematically illustrates a flowchart of a virtual object processing method according to another embodiment of the present disclosure. In this embodiment, in addition to operations S201 to S203 described above with reference to FIG. 2, operations S308 to S309 are also included. For brevity of description, the description of operations S201 to S203 is omitted here.

As shown in FIG. 3E, the virtual object processing method further includes operations S308-S309.

In operation S308, an input operation for a virtual object and/or a virtual sub-object is received.

In operation S309, a process corresponding to the input operation is performed.

Through the embodiments of the present disclosure, virtual objects and virtual sub-objects are distributed in different display layers, and the virtual objects and/or virtual sub-objects in the virtual reality space can be directly operated, which achieves effects of quick operations and facilitates users to find objects, and thus enhances the user experience.

Figure 4A:
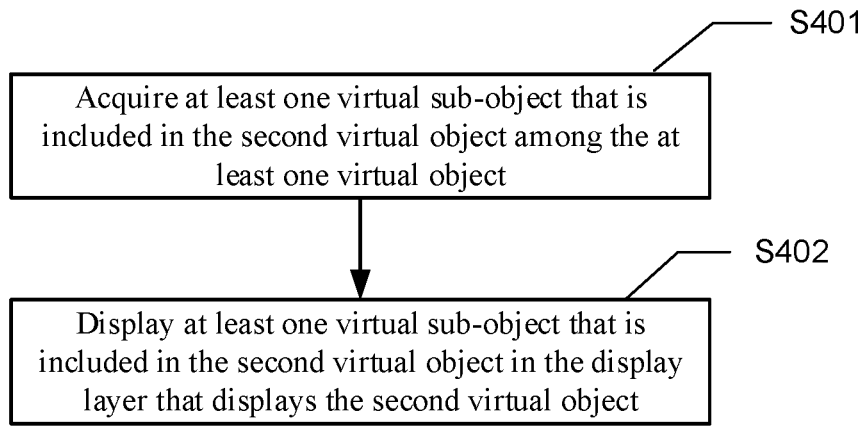
FIG. 4A schematically illustrates a flowchart of a virtual object processing method according to another embodiment of the present disclosure.

FIG. 4A schematically illustrates a flowchart of a virtual object processing method according to another embodiment of the present disclosure. In this embodiment, in addition to operations S201 to S203 described above with reference to FIG. 2, operations S401 to S402 are also included. For brevity of description, the description of operations S201 to S203 is omitted here.

As shown in FIG. 4A, the virtual object processing method further includes operations S401 to S402.

In operation S401, at least one virtual sub-object that is included in a second virtual object among the at least one virtual object is acquired.

In operation S402, at least one virtual sub-object that is included in the second virtual object is displayed on a display layer that displays the second virtual object.

Figure 4B:
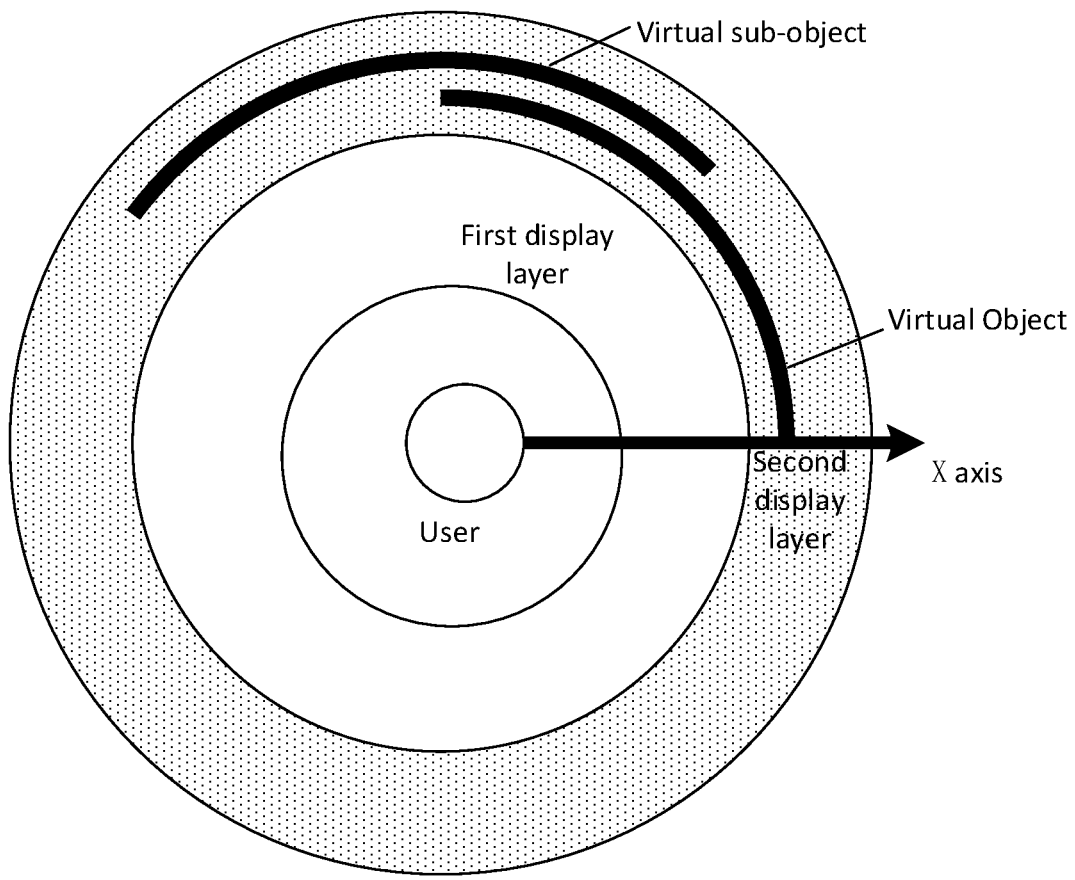
FIG. 4B schematically illustrates an arrangement of virtual objects and virtual sub-objects in a display layer according to an embodiment of the present disclosure.

According to an embodiment of the present disclosure, after at least one virtual object is displayed on at least one display layer, at least one virtual sub-object that is included in the second virtual object is acquired, and the at least one sub-object of the second virtual object is displayed in the display layer that displays the second virtual object. According to an embodiment of the present disclosure, FIG. 4B schematically illustrates a schematic diagram of an arrangement of the virtual objects and the virtual sub-objects in a display layer according to an embodiment of the present disclosure. As shown in FIG. 4B, a second virtual object is displayed in the second display layer, and a virtual sub-object of the second virtual object is displayed in the second display layer.

Through the embodiments of the present disclosure, distributing virtual objects and virtual sub-objects in the same display layer can not only improve space utilization efficiency, but also achieve fast operation on the virtual objects and/or virtual sub-objects in a virtual reality space to achieve an effect of fast positioning.

According to an embodiment of the present disclosure, the virtual object processing method further includes switching a relative position of the second display layer and other display layers in at least one display layer, where the second display layer is different from the other display layers described above.

According to the embodiments of the present disclosure, the positions of the display layers in the virtual reality space can be arbitrarily switched. For example, the positions of the second display layer and the third display layer can be interchanged, and the first display layer and the third display layer can be interchanged. Regardless of the interchange method, the relative positions of the second display layer and other display layers have changed. In the above manner, not only the position of the display layer can be switched arbitrarily, but also the display layer can be closest to the user's position, achieving the effects of rapid positioning and quick operation of virtual objects and/or virtual sub-objects.

Figure 5:
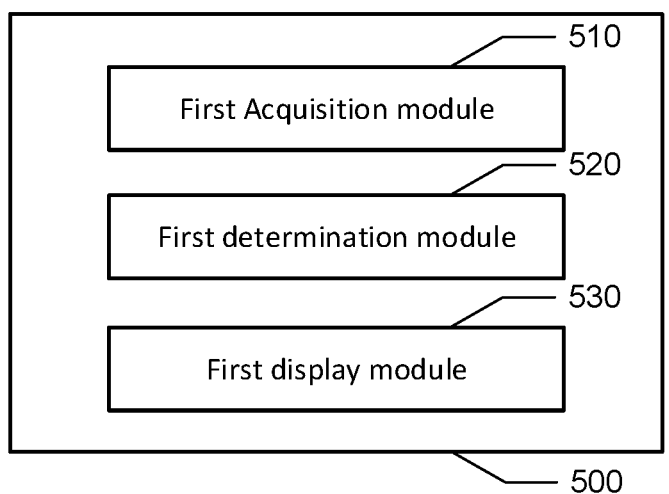
FIG. 5 schematically illustrates a block diagram of a virtual reality system according to an embodiment of the present disclosure.

FIG. 5 schematically illustrates a block diagram of a virtual reality system according to an embodiment of the present disclosure.

As shown in FIG. 5, the virtual object processing system 500 includes a first acquisition module 510, a first determination module 520, and a first display module 530. The virtual reality system 500 may execute the method described above with reference to FIGS. 2A to 4B.

According to an embodiment of the present disclosure, the first acquisition module 510 is configured to acquire at least one virtual object.

The first determination module 520 is configured to determine at least one display layer in the virtual reality space, where the virtual reality space is divided into a plurality of display layers, and the plurality of display layers are arranged in a stacked manner.

The first display module 530 is configured to display the at least one virtual object in the at least one display layer.

Through the embodiments of the present disclosure, the virtual reality space is layered to acquire plurality of display layers, and the virtual objects in the virtual reality space are scattered and displayed in the display layers, so that not only the virtual objects in the virtual reality space, when displayed in the space, can exhibit more sense of space, but also the space can be used more efficiently.

It can be understood that the first acquisition module 510, the first determination module 520, and the first display module 530 may be combined and implemented in one module, or any one of the modules may be split into multiple modules. Alternatively, at least part of the functions of one or more of these modules may be combined with at least part of the functions of other modules and implemented in one module. According to an embodiment of the present invention, at least one of the first acquisition module 510, the first determination module 520, and the first display module 530 may be at least partially implemented as a hardware circuit, such as a field programmable gate array (FPGA), a programmable Logic Array (PLA), system on chip, system on substrate, system on package, application specific integrated circuit (ASIC), or any other reasonable way to integrate or package the circuit, such as hardware or firmware, or implemented by a proper combination of three implementation modes: software, hardware, and firmware. Alternatively, at least one of the acquisition module 510, the determination module 520, and the display module 530 may be at least partially implemented as a computer program module, and when the program is executed by a computer, the functions of the corresponding module may be performed.

Figure 6:
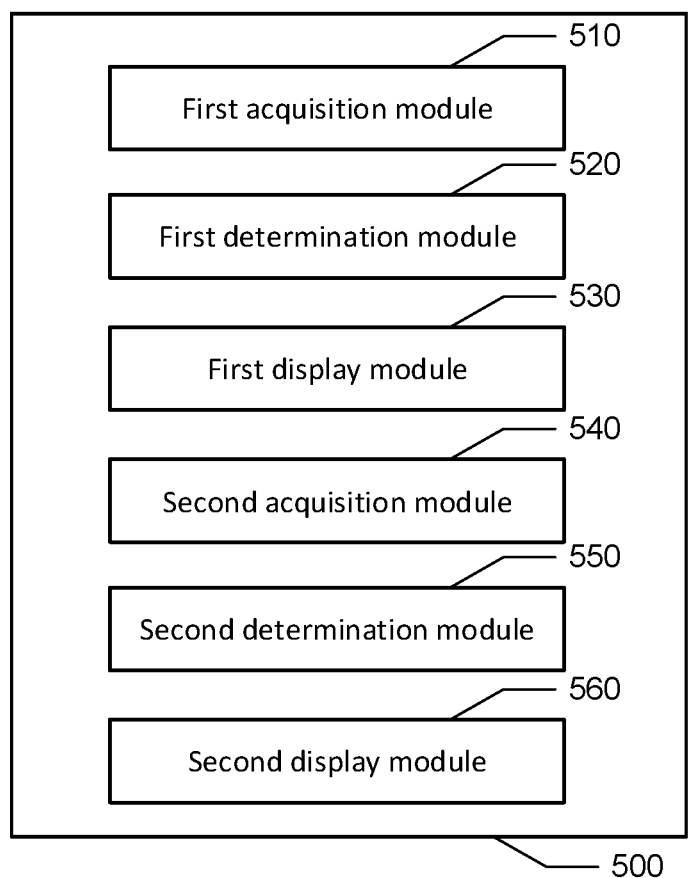
FIG. 6 schematically illustrates a block diagram of a virtual reality system according to another embodiment of the present disclosure.

FIG. 6 schematically illustrates a block diagram of a virtual reality system according to another embodiment of the present disclosure.

According to an embodiment of the present disclosure, any one or more of the at least one virtual object includes at least one virtual sub-object. The virtual object processing system 500 further includes a second acquisition module 540, a second determination module 550, and a second display module 560. The second acquisition module 540 is configured to acquire at least one virtual sub-object that is included that is in the first virtual object among the at least one virtual object after the at least one virtual object is displayed in the at least one display layer. The second determination module 550 is configured to determine at least one first display layer in the virtual reality space to display at least one virtual sub-object that is included in the first virtual object, where the at least one first display layer is different from the display layer that displays the first virtual object. The second display module 560 is configured to display at least one virtual sub-object on at least one first display layer.

Figure 7:
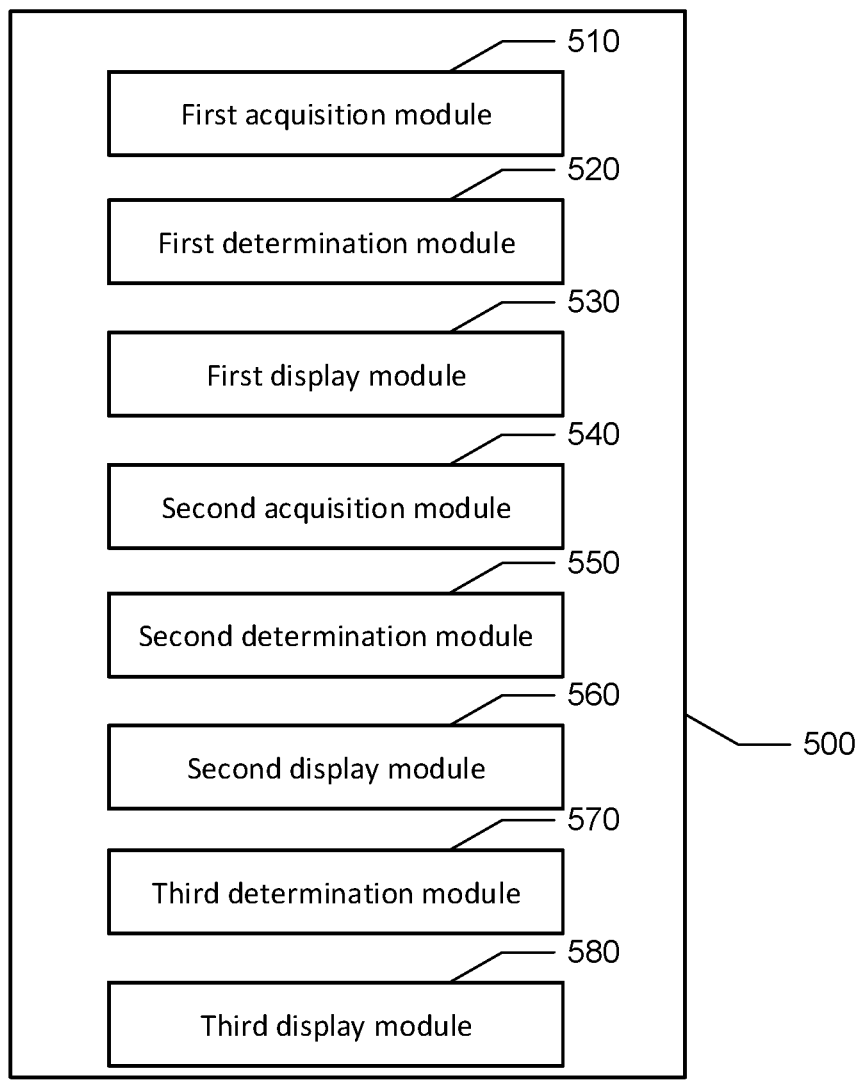
FIG. 7 schematically illustrates a block diagram of a virtual reality system according to another embodiment of the present disclosure.

FIG. 7 schematically illustrates a block diagram of a virtual reality system according to another embodiment of the present disclosure.

According to an embodiment of the present disclosure, the virtual object processing system 500 further includes a third determination module 570 and a third display module 580. The third determination module 570 is configured to determine at least one second region of the first display layer based on the first region of the first virtual object in the display layer that displays the first virtual object. The third display module 580 is configured to display at least one virtual sub-object that is included in the first virtual object in the second region.

Figure 8:
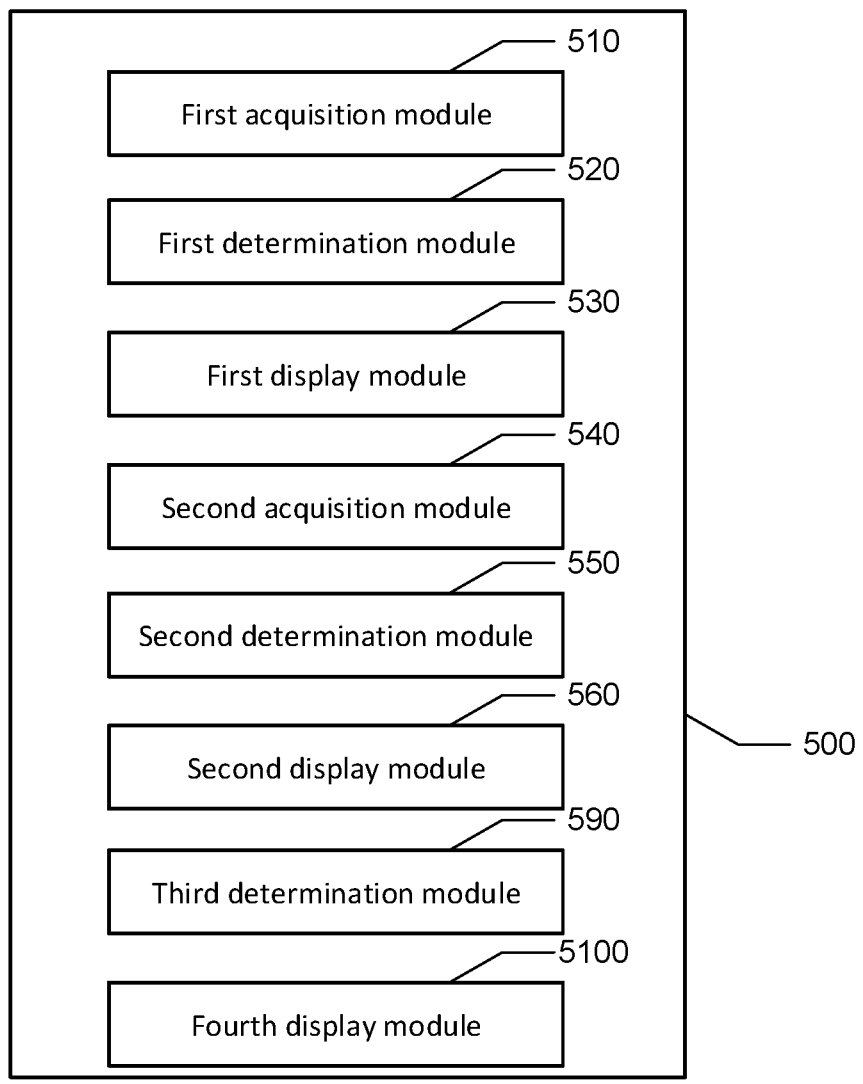
FIG. 8 schematically illustrates a block diagram of a virtual reality system according to another embodiment of the present disclosure.

FIG. 8 schematically illustrates a block diagram of a virtual reality system according to another embodiment of the present disclosure.

According to an embodiment of the present disclosure, at least one virtual sub-object that is included in the first virtual object includes at least a first virtual sub-object. The virtual object processing system 500 further includes a processing module 590 and a fourth display module 5100. The processing module 590 is configured to pre-process the first virtual sub-object to acquire processing information; and the fourth display module 5100 is configured to display the processing information on at least one first display layer.

Figure 9:
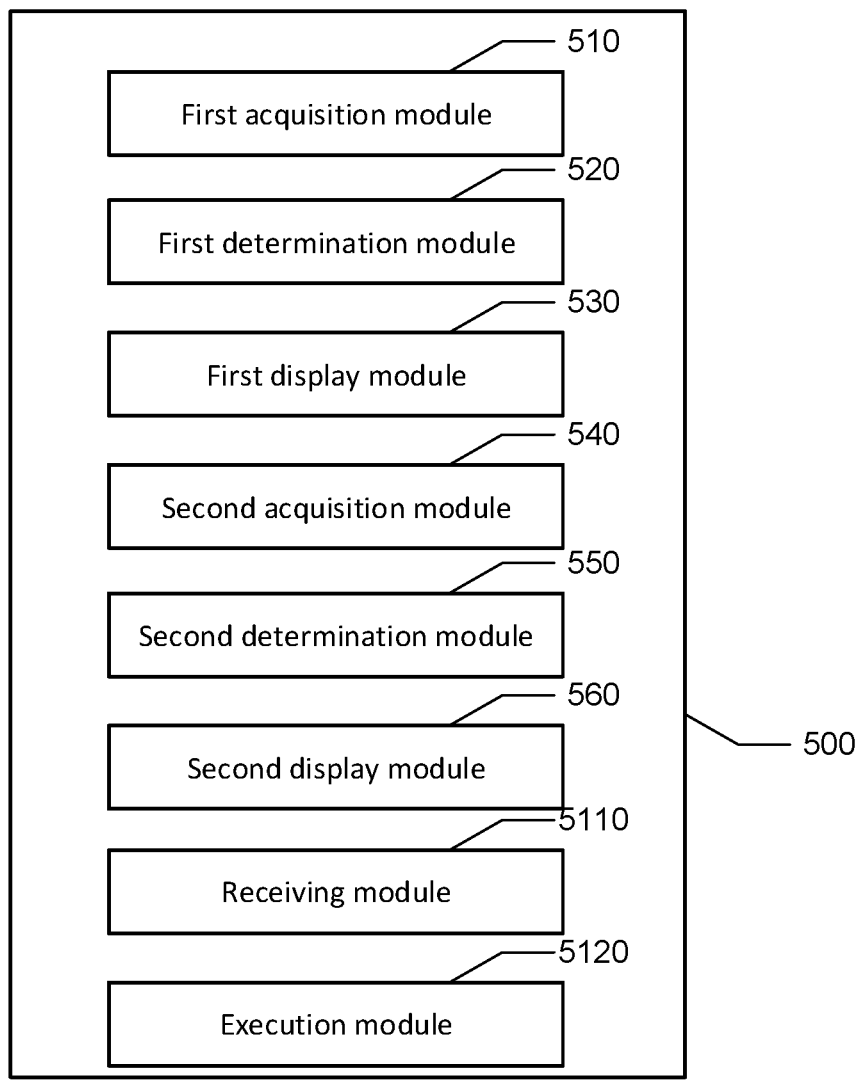
FIG. 9 schematically illustrates a block diagram of a virtual reality system according to another embodiment of the present disclosure.

FIG. 9 schematically illustrates a block diagram of a virtual reality system according to another embodiment of the present disclosure.

According to an embodiment of the present disclosure, the virtual object processing system 500 includes a receiving module 5110 and an execution module 5120. The receiving module 5110 is configured to receive an input operation for a virtual object and/or a virtual sub-object. The execution module 5120 is configured to execute a process corresponding to the input operation.

Figure 10:
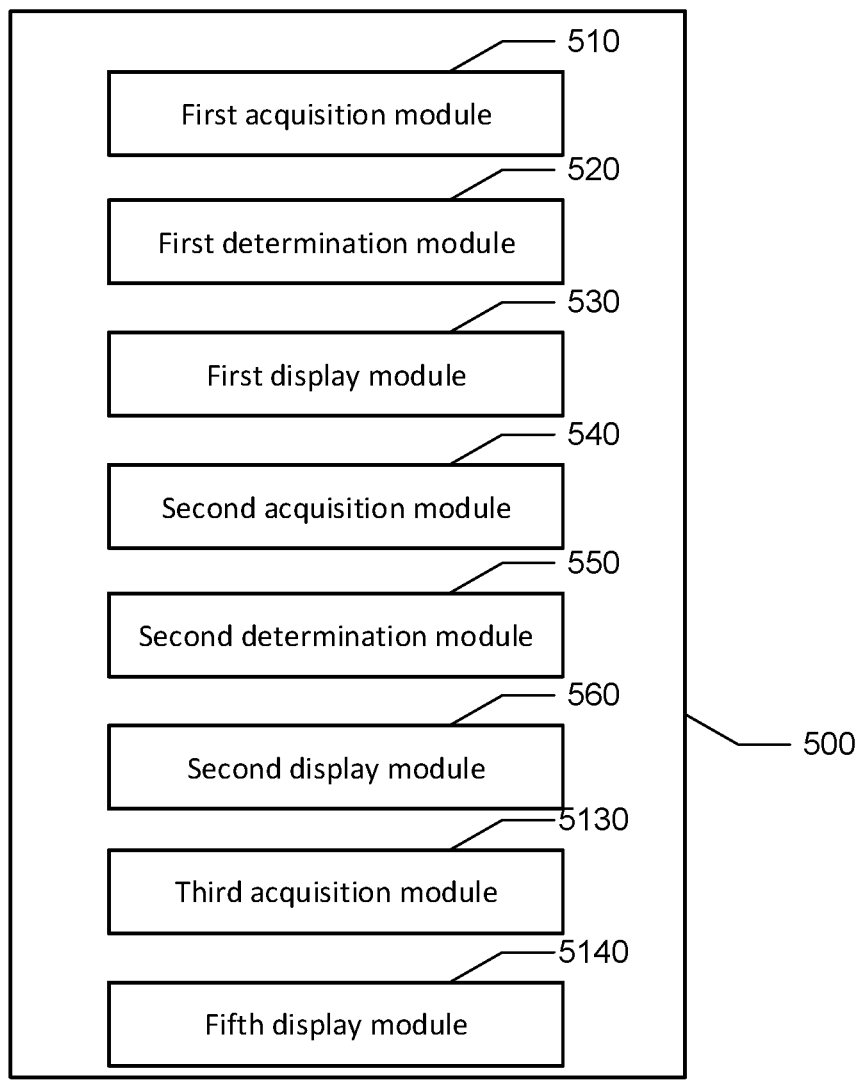
FIG. 10 schematically illustrates a block diagram of a virtual reality system according to another embodiment of the present disclosure.

FIG. 10 schematically illustrates a block diagram of a virtual reality system according to another embodiment of the present disclosure.

According to an embodiment of the present disclosure, the virtual object processing system 500 further includes a third acquisition module 5130 and a fifth display module 5140. The third acquisition module 5130 is configured to acquire at least one virtual sub-object that is included in the second virtual object among the at least one virtual object.

The fifth display module 5140 is configured to display at least one virtual sub-object that is included in the second virtual object on a display layer that displays the second virtual object.

Figure 11:
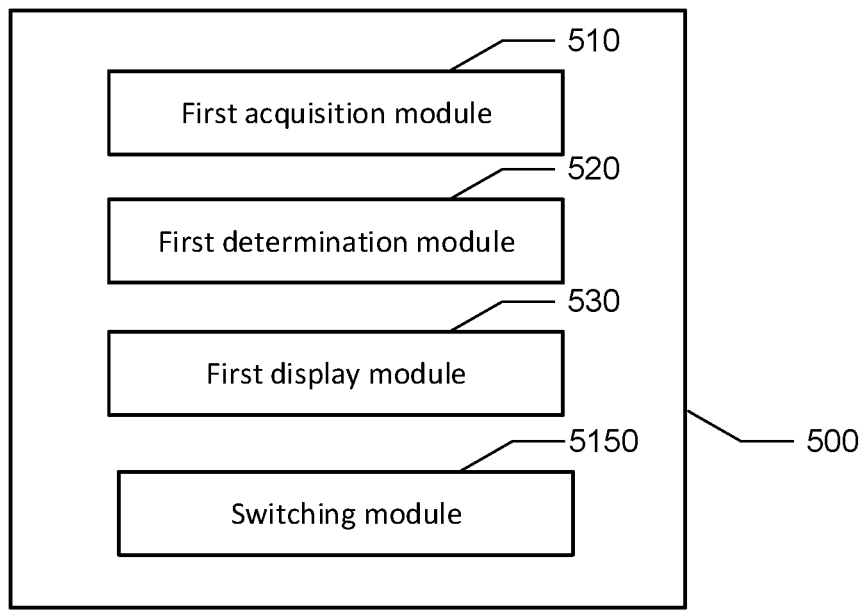
FIG. 11 schematically illustrates a block diagram of a virtual reality system according to another embodiment of the present disclosure.

FIG. 11 schematically illustrates a block diagram of a virtual reality system according to another embodiment of the present disclosure.

According to an embodiment of the present disclosure, the virtual object processing system 500 further includes a switching module 5150 for switching relative positions of the second display layer and the other display layers in the at least one display layer, where the second display layer is different from the other display layers.

Another aspect of the present disclosure provides a virtual reality device including at least one memory, at least one processor, and a display module. The at least one memory stores computer programs. The at least one processor is configured to execute the computer programs to achieve the following operations: acquiring at least one virtual object; determining at least one display layer in the virtual reality space, where the virtual reality space is divided into a plurality of display layers, and the plurality of display layers are arranged in a stacked manner. The display module is configured to display at least one virtual object on at least one display layer based on a processing result of the at least one processor.

Figure 12:
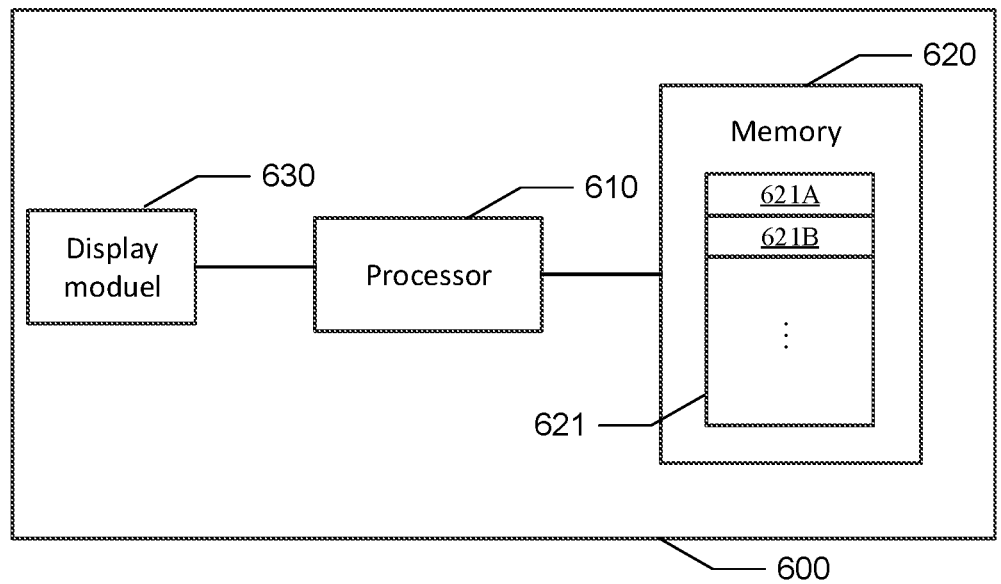
FIG. 12 schematically illustrates a block diagram of a virtual reality device according to another embodiment of the present disclosure.

FIG. 12 schematically illustrates a block diagram of a virtual reality device according to another embodiment of the present disclosure.

As shown in FIG. 12, the virtual reality device 600 includes a processor 610, a memory 620, and a display module 630. The virtual reality device 600 may execute the method described above with reference to FIGS. 2A to 4B. It should be noted that the virtual reality device may be a wearable device, such as glasses.

According to the embodiment of the present disclosure, when the user wears the virtual reality device, the virtual object in the virtual reality space, when displayed in the space, can exhibit more sense of space, and also the space can be more fully and effectively used.

According to an embodiment of the present disclosure, any one or more virtual objects in the at least one virtual object include at least one virtual sub-object. Herein, the at least one processor is further configured, after the display module displays the at least one virtual object in the at least one display layer, to acquire at least one virtual sub-object that is included in a first virtual object of the at least on virtual object; to determine at least one first display layer in the virtual reality space to display the at least one virtual sub-object that is included in the first virtual object. Herein, the at least one first display layer is different from the display layer that displays the first virtual object. The display module is further configured to display at least one virtual sub-object in the at least one first display layer based on a processing result of the at least one processor.

The embodiments of the present disclosure achieve the effects of fast operation and convenient user search for objects, and also improve user experience.

Specifically, the processor 610 may include, for example, a general-purpose microprocessor, an instruction set processor and/or an associated chipset and/or a special-purpose microprocessor (for example, an application-specific integrated circuit (ASIC)), and so on. The processor 610 may also include on-board memory for caching purposes. The processor 610 may be a single processing unit or a plurality of processing units for performing different actions of the method flow according to the embodiment of the present disclosure described with reference to FIGS. 2A to 4B.

The memory 620 may be, for example, any medium capable of containing, storing, transmitting, propagating, or transmitting instructions. For example, a readable storage medium may include, but is not limited to, an electronic, magnetic, optical, electromagnetic, infrared, or semiconductor system, apparatus, device, or propagation medium. Specific examples of readable storage media include magnetic storage devices such as magnetic tapes or hard disks (HDD); optical storage devices such as optical disks (CD-ROM); memories such as random-access memory (RAM) or flash memory; and/or wired/wireless communication link.

The memory 620 may include a computer program 621, which may include codes/computer-executable instructions that, when executed by the processor 610, cause the processor 610 to execute, for example, the method flow described above with references to FIGS. 2A to 4B and any variation thereof.

The computer program 621 may be configured to have computer program code including, for example, a computer program module. For example, in exemplary embodiments, the code in the computer program 621 may include one or more program modules, including, for example, 621A, modules 621B, . . . It should be noted that the division manner and number of modules are not fixed, and those skilled in the art can use appropriate program modules or program module combinations according to the actual situation. When these program module combinations are executed by the processor 610, the processor 610 can execute, for example, the method flow described above with references to FIG. 2A to FIG. 4B and any variations thereof.

According to an embodiment of the present disclosure, the processor 610 may interact with the display module 630 to execute the method flow described above with references to FIGS. 2A to 4B and any variations thereof.

According to an embodiment of the present invention, at least one of the acquisition module 510, the determination module 520, and the display module 530 may be implemented as a computer program module described with reference to FIG. 6, and when executed by the processor 610, may implement the corresponding operations described above.

Those skilled in the art should understand that the features described in embodiments and/or claims of the present disclosure can be combined in various manners, even though such combinations are not explicitly described in the present disclosure. In particular, various combinations of features described in various embodiments and/or claims of the present disclosure may be made without departing from the spirit and teaching of the present disclosure. All these combinations shall fall within the scope of the present disclosure.

Although the present disclosure has been shown and described with reference to specific exemplary embodiments thereof, it will be understood by those skilled in the art that without departing from the spirit and scope of the present disclosure defined by the appended claims and their equivalents, various modifications in form and detail may be made to the present disclosure. Therefore, the scope of the present disclosure should not be limited to the above-described embodiments but should be determined not only by the appended claims but also by the equivalents of the appended claims.

What is claimed is:

1. A virtual object processing method, comprising:
   acquiring at least one virtual object, the at least one virtual object including and having a mapping relationship with at least one virtual sub-object;
   determining one first display layer in a virtual reality space, wherein the virtual reality space is divided into a plurality of display layers and the plurality of display layers are arranged in a stacked manner;
   determining and displaying the at least one virtual object and the at least one virtual sub-object in the same one first display layer of the plurality of display layers to use the virtual reality space efficiently;
   in response to an input operation, switching relative positions of any one display layer of the plurality of display layers arbitrarily in any order relative to other display layers of the plurality of display layers, including switching the relative positions of all of the at least one virtual objects and the at least one sub virtual-objects contained in a corresponding display layer, wherein the plurality of displayer layers have at least three display layers,
   after each of at least one virtual objects is displayed in the one first display layer of the plurality of display layers, pre-processing the virtual sub-object to acquire processing information, the processing information is content of the virtual sub-object; and
   displaying the processing information in the one first display layer to preview the content for the corresponding virtual sub-object, wherein the virtual sub-object is one of the following: a movie, a document and a program.

2. The method according to claim 1, wherein the method further comprises:
   determining, based on a first region of the at least one virtual object in the one first display layer displaying the virtual object, a second region of the one first display layer; and
   displaying the at least one virtual sub-object in the second region.

3. The method according to claim 1 further comprising:
   receiving an input operation for the virtual object or the virtual sub-object; and
   performing a process corresponding to the input operation.

4. A virtual object processing system, comprising:
   a first acquisition module, configured to acquire at least one virtual object, the at least one virtual object including and having a mapping relationship with at least one virtual sub-object;
   a first determination module, configured to determine one display layer in a virtual reality space, wherein the virtual reality space is divided into a plurality of display layers, and the plurality of display layers are stacked and to determine the one virtual object and the at least one virtual sub-object to be displayed in the same one first display layer of the plurality of display layers to use the virtual reality space efficiently;
   a first display module, configured to display the at least one virtual object and the at least one virtual sub-object accordingly;
   a switching module, configured to switch relative positions of any one display layer of the plurality of display layers in any order relative to the other display layers of the plurality of display layers, including to switch the relative positions of all of the at least one virtual objects and the at least one sub virtual-objects contained in a corresponding display layer, wherein the plurality of displayer layers have at least three display layers;

a processing module, configured to, after each of the at least one virtual objects is displayed in the one first display layer of the plurality of display layers, pre-process the virtual sub-object to acquire processing information, the processing information is content of the virtual sub-object; and a fourth display module configured to display the processing information in the one first display layer to preview the content for the corresponding virtual sub-object, wherein the virtual sub-object is one of the following: a movie, a document and a program.

5. The system according to claim 4 further comprising:

a third determination module, configured to determine, based on a first region of the virtual object in the one first display layer displaying the at least one virtual object, a second region of the one first display layer; and a third display module, configured to display the at least one virtual sub-object in the second region.

6. The system according to claim 4 further comprising:

a receiving module, configured to receive an input operation for the virtual object or the virtual sub-object; and an execution module, configured to perform a process corresponding to the input operation.

7. A virtual reality device, comprising:

at least one memory having a computer program stored thereon;

at least one processor, configured to execute the computer program to implement the following operations:
  acquiring one virtual object, the one virtual object including and having a mapping relationship with at least one virtual sub-object;
  determining one first display layer in the virtual reality space, wherein the virtual reality space is divided into a plurality of display layers, and the plurality of display layers are arranged in layers;
  determining the one virtual object and the at least one virtual sub-object in the same one first display layer of the plurality of display layers to use the virtual reality space efficiently;
  in response to an input operation, switching relative positions of any one display layer of the plurality of display layers arbitrarily in any order relative to other display layers of the plurality of display layers, including switching the relative positions of all of the at least one virtual objects and the at least one sub virtual-objects contained in a corresponding display layer, wherein the plurality of displayer layers have at least three display layers; and a first display module, configured to display the one virtual object and the at least one virtual sub-object based on a processing result of the at least one processor a processing module, configured to, after each of the at least one virtual objects is displayed in the one first display layer of the plurality of display layers, pre-process the virtual sub-object to acquire processing information, the processing information is content of the virtual sub-object; and a fourth display module configured to display the processing information in the one first display layer to preview the content for the corresponding virtual sub-object, wherein the virtual sub-object is one of the following: a movie, a document and a program.

8. The system according to claim 7 further comprising:

a third determination module, configured to determine, based on a first region of the virtual object in the one first display layer displaying the first virtual object, a second region of the one first display layer; and a third display module, configured to display the at least one virtual sub-object in the second region.

9. The system according to claim 7 further comprising:

a processing module, configured to pre-processing the at least one virtual sub-object to acquire processing information; and a fourth display module, configured to display the processing information in the at least one first display layer.

10. The system according to claim 7 further comprising:

a receiving module, configured to receive an input operation for the at least one virtual object or the at least one virtual sub-object; and an execution module, configured to perform a process corresponding to the input operation.

* * * * *